United States Patent [19]
Kakinami et al.

[11] Patent Number: 5,230,400
[45] Date of Patent: Jul. 27, 1993

[54] VEHICLE CRUISE CONTROL SYSTEM

[75] Inventors: Toshiaki Kakinami, Tsuchiura; Mitsuyoshi Saiki; Jun Sato, both of Tsukuba, all of Japan

[73] Assignee: Aisin Seiki Kabushiki Kaisha, Kariya, Japan

[21] Appl. No.: 801,479

[22] Filed: Dec. 2, 1991

[30] Foreign Application Priority Data

Nov. 30, 1990 [JP] Japan .................. 2-335142

[51] Int. Cl.⁵ ............................. B60K 31/08
[52] U.S. Cl. ................... 180/169; 180/170; 180/175; 180/176; 180/177; 340/904; 364/426.04; 364/456; 364/461
[58] Field of Search ............ 180/168, 167, 169, 170, 180/175, 178, 176, 179, 177; 340/901, 903, 904; 364/426.04, 424.01, 424.02, 456, 461

[56] References Cited

U.S. PATENT DOCUMENTS

| | | | |
|---|---|---|---|
| 4,079,802 | 3/1978 | Kawata | 180/169 |
| 4,095,666 | 6/1978 | Baba et al. | 180/169 |
| 4,621,705 | 11/1986 | Etoh | 180/169 |
| 4,622,636 | 11/1988 | Tachibana | 180/169 |
| 4,706,195 | 11/1987 | Yoshino et al. | 180/169 |
| 4,931,937 | 6/1990 | Kakinami et al. | 180/169 |
| 5,053,979 | 10/1991 | Etoh | 364/565 |

FOREIGN PATENT DOCUMENTS 62-153531  7/1987  Japan .
1-66712   3/1989  Japan .

Primary Examiner—Richard M. Camby
Attorney, Agent, or Firm—Sughrue, Mion, Zinn, Macpeak & Seas

[57] ABSTRACT

A cruise control system for vehicles uses a video camera to follow a vehicle driving ahead at a constant distance and speed on a highway. The system detects the distance to a vehicle and a relative speed to set the upper and lower limitations for the distance and the speed. The system controls a speed of the vehicle in accordance with the comparisons of the detected distance and speed with the limitations.

3 Claims, 22 Drawing Sheets

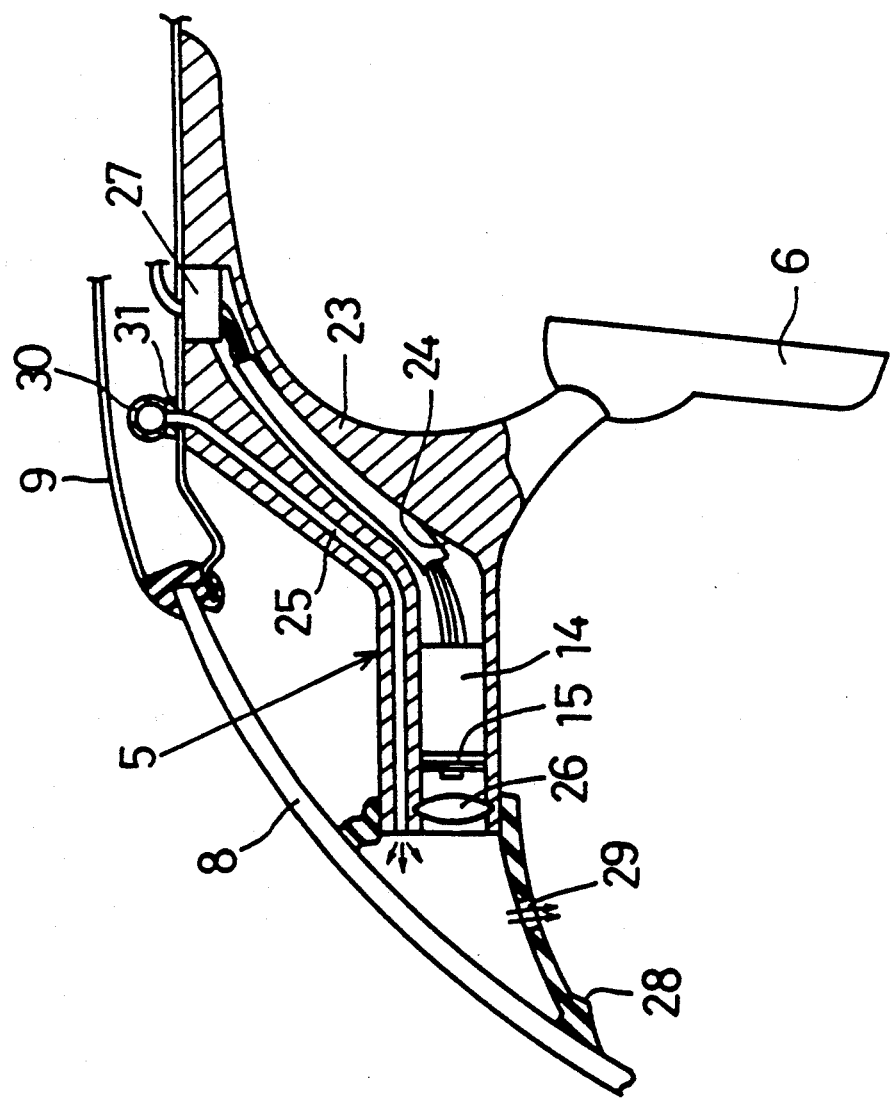

FIG. 2b

| CURRENT MODE | NEXT MODE | DISPLAY | | | | | BUZZER | NOTE |
|---|---|---|---|---|---|---|---|---|
| | | A.D. | SPEED CONTROL | VEHICLE | DISTANCE | TEMPLATE | | |
| WAITING | NONE | OFF | OFF | OFF | OFF | OFF | OFF | |
| | LOCK ON | | | | | | SINGLE | MANUAL |
| LOCK-ON | NONE | ON | OFF | OFF | | OFF | OFF | NO VEHICLE |
| | NONE | | | FLASH | | FLASH | MULTI | DETECT A VEHICLE |
| | WAITING SPEED CONTROL DISTANCE CONTROL | ON | ON | | | | SINGLE | MANUAL |
| SPEED CONTROL | NONE | | FLASH OFF | | | | MULTI OFF | AUTO |
| | WAITING LOCK ON DISTANCE CONTROL | | | | | | SINGLE | MANUAL |
| DISTANCE CONTROL | NONE | ON | OFF | ON | ON | ON | OFF | |
| | WAITING LOCK ON DISTANCE CONTROL | | | | FLASH OFF | | MULTI OFF | AUTO |
| | WAITING LOCK ON SPEED CONTROL | | | | | | SINGLE | MANUAL |

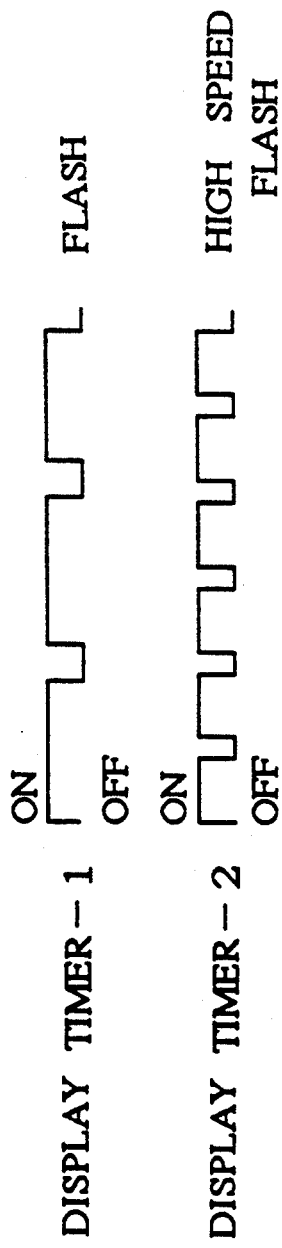

| SPEED / DISTANCE | SMALLER THAN Vd | BETWEEN THAN Vd AND Vu | GREATER THAN Vu |
|---|---|---|---|
| SMALLER THAN Ld | CANCEL<br><br>REGION 1 | DECREASE<br><br>REGION 2 | DECREASE<br><br>REGION 3 |
| BETWEEN Ld AND Lu | INCREASE<br><br>REGION 4 | HOLD<br><br>REGION 5 | DECREASE<br><br>REGION 6 |
| GREATER THAN Lu | INCREASE<br><br>REGION 7 | INCREASE<br><br>REGION 8 | KEEP AT Vs<br>REGION 9 |

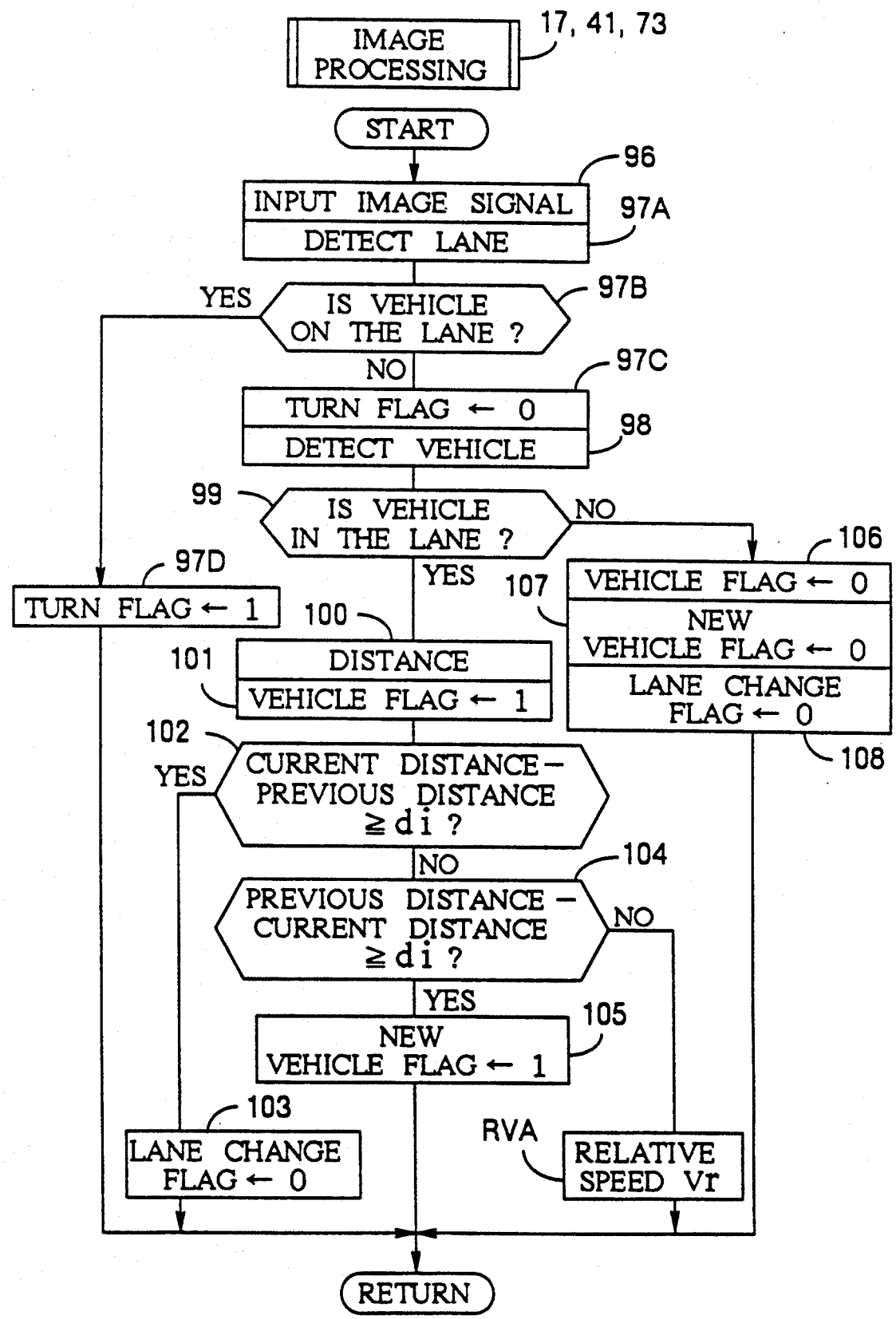

5,230,400

VEHICLE CRUISE CONTROL SYSTEM

BACKGROUND OF THE INVENTION

1. Field of the Invention

The present invention relates to a cruise control for an automobile, especially to a system uses a video camera to detect a vehicle driving ahead so that a system can keep a constant distance to the vehicle as well as a constant speed.

2. Description of the Prior Art

A conventional cruise control system is shown in Japanese Patent Laid Open 62-153531 (1987). When many vehicles are running at relatively high speed in a highway using cruise controls, distances between vehicles often become closer. Japanese Patent Laid Open 64-66712 (1989) shows a system has a video camera mounted on a vehicle. A video camera takes pictures of the scenes ahead of the vehicle. The pictures are processed to detect the lanes and a vehicle driving in the lane ahead of the vehicle. A system decreases the speed of the vehicle when a distance becomes smaller than a predetermined distance to keep safety.

This conventional system controls a speed set by a driver, however, it is better to drive at a speed matching with a flow of vehicles in a highway. This reduces driver's fatigue and dangerous situations caused by deference of the speeds.

SUMMARY OF THE INVENTION

Accordingly, one of the objects of the present invention is to produce a vehicle cruise control system to obviate the above drawbacks.

Another object of the present invention is to produce a vehicle cruise control system which can follow a vehicle driving ahead.

To achieve the above objects, and in accordance with the principles of the invention as embodied and broadly described herein, a vehicle cruise control system comprises means for detecting a distance to a vehicle driving ahead of the vehicle, means for detecting an actual speed of the vehicle, means for determining a cruising speed of the vehicle, means for setting upper and lower speed limitations and upper and lower distance limitations in accordance with said distance and speed, means for controlling the speed of the vehicle for increasing a speed of the vehicle when said actual speed is smaller than said lower speed limitation, decreasing a speed of the vehicle when said actual speed is higher than said upper speed limitation, increasing a speed of the vehicle when said distance is greater than said lower distance limitation, and decreasing a speed of the vehicle when said distance is smaller than said upper distance limitation.

In accordance with the above mentioned cruise control system, the system detects the distance to a vehicle and a relative speed to set the upper and lower limitations for the distance and the speed. The system controls a speed of the vehicle in accordance with the comparisons of the detected distance and speed with the limitations to follow a vehicle driving ahead with keeping constant distance and speed.

BRIEF DESCRIPTION OF THE DRAWING

For a full understanding of the true scope of the invention, the following detailed description should be read in conjunction with the drawing, wherein

FIG. 1c is a drawing which shows a cut view of the automobile along the line IC—IC in FIG. 1b.

FIG. 1e is a drawing which shows an electric circuit diagram of a speed control device shown in FIG. 1a.

FIG. 2a is a drawing which shows control modes of a speed control device shown in FIG. 1a.

FIG. 2b is another drawing which shows control modes of a speed control device shown in FIG. 1a.

FIG. 3a is a drawing which shows a monitor shown in FIG. 1a.

FIG. 3b is a drawing which shows a timing of a buzzer shown in FIG. 1a.

FIG. 3c is a drawing which shows a display of a monitor shown in FIG. 1a.

FIG. 4b is a drawing which shows a region DA 1 shown in FIG. 4a.

FIG. 4c is a drawing which shows operations corresponding to regions shown in FIG. 4b.

FIG. 6 is a flow chart which shows an operation of a processor CPU 2 of the present invention.

DETAILED DESCRIPTION OF THE PREFERRED EMBODIMENTS

In the following, preferred embodiments of the present invention will be described with reference to the drawings.

FIG. 1 shows a block diagram of a cruise control system of the present invention.

Referring to FIG. 1, this system controls a speed of the vehicle in accordance with a distance to a vehicle driving ahead. Pictures taken by a video camera 15 is used to detect a distance. Microprocessors CPU 1 and CPU 2 process pictures of the video camera 15 to detect a lane where the vehicle is driving, an obstacle in the lane such as a vehicle driving ahead, a distance to an obstacle and a relative speed to an obstacle. This information is simplified to display on a monitor CRT 1 for a driver. Microprocessor CPU 3 shown in FIG. 1e controls a throttle in accordance with a distance to an obstacle and a relative speed to an obstacle. If a braking provided with throttle control is not enough, then the system uses a brake control device 3 to apply a brake.

An example of such brake control device will be explained. A power booster is connected to a master cylinder of the brake. A power booster has a vacuum room and a pressure room divided by a power piston. A pressure room is further divided into the first room and the second room by a wall. The second room is connected to the first room though a solenoid valve which is opened normally. A valve mechanism connected to a brake pedal is installed in the power piston. The valve connects the second room with the vacuum room in response to the brake pedal. The power piston puts a power to an output rod in the master cylinder to assist the brake pedal. A solenoid valve is connected to the first room. The first room is connected to the atmosphere when the solenoid valve operates. Thus the output rod is operated without the brake pedal movement. While the brake control device 3 sends the signal to the solenoid valve, the brake is applied.

Figure 1A:
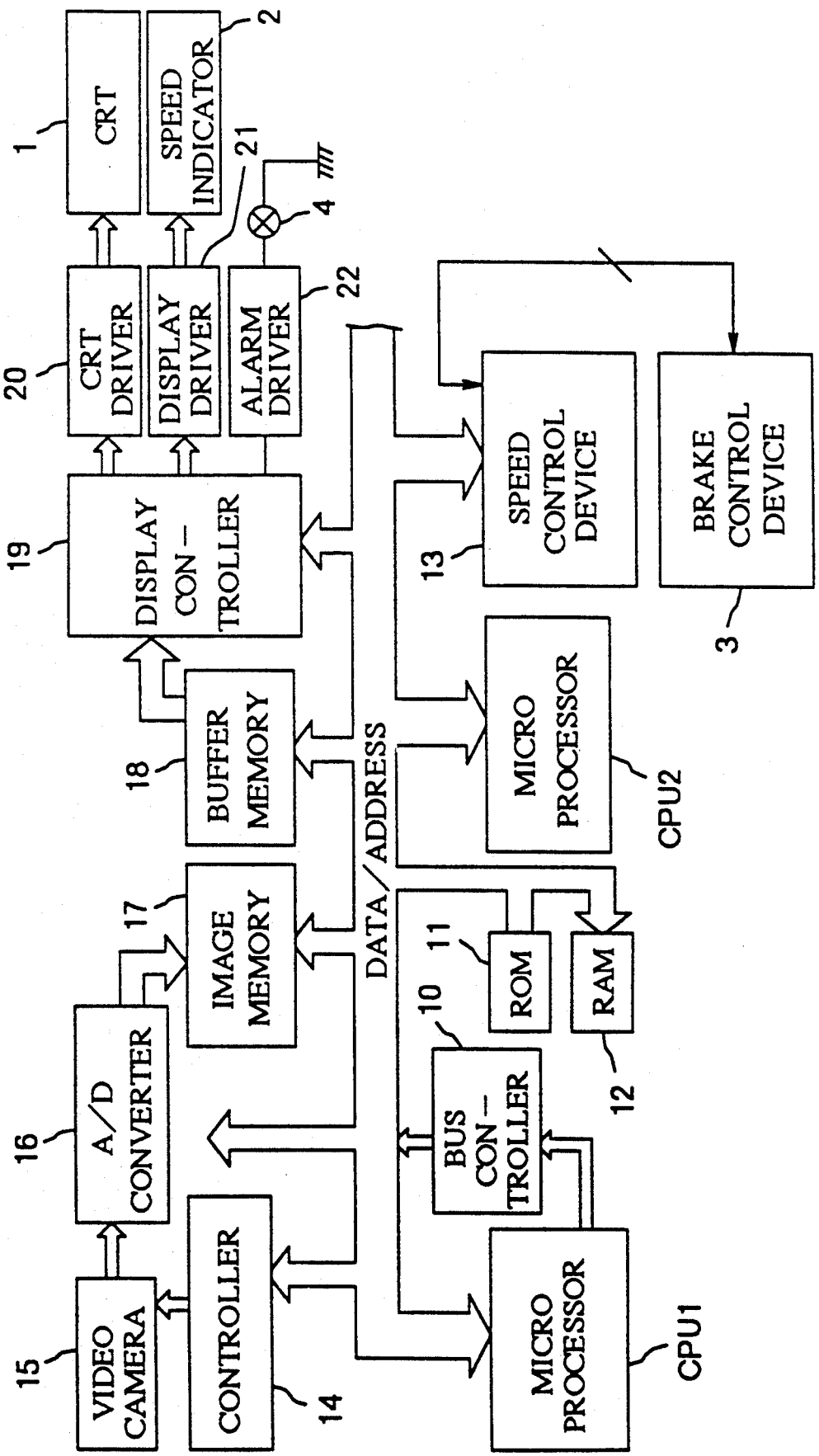
FIG. 1a is a block diagram of a vehicle cruise control system of the present invention.
Figure 1B:
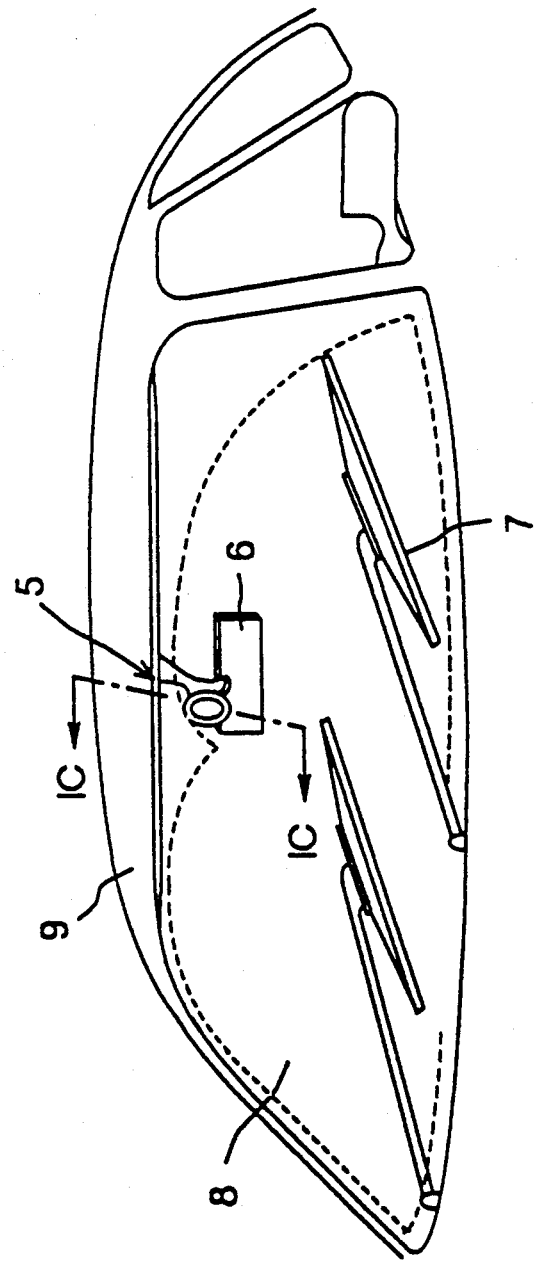
FIG. 1b is a drawing which shows a front view of an automobile mounted with a video camera in accordance with the present invention.

FIGS. 1b and 1c show a video camera 15 mounted inside a vehicle. The video camera 15 is mounted to the arm 5 which also supports the room mirror 6. The arm 5 is like a "Y" shape and provided with a passage 24 for the electric cables of the video camera 15 and a passage 25 for air. The downward projection of the arm 5 supports the room mirror 6. The end of the passage 24 has a larger diameter and in the portion of the passage, the video camera 15 is inset into the passage 24. The video camera 15 consists of a lens 26, a video camera 15 and a video camera controller 14. The cables form the video controller 14 go through the passage 24 and connect with a connector 27. The upper end of the sir passage 25 is connected with an air pipe 30 by a connector 31 and the air pipe 30 is connected to an air conditioner (not shown). The other end of the air passage 25 is opened to the inside of a boot 28 and towards the front glass 8. The boot 28 is connected to the end of the arm 5 and the other end of the boot 28 is pressed to the front glass 8. The boot 28 makes a closed room with the front glass 8 so the video camera 15 is isolated from both the outside and the inside of the vehicle. The boot 28 has a little opening 29 which evacuates the sir sent from the sir passage 25 into the boot 28. This air flow coming in form the air passage 25 and going out from the opening 29 takes the humidity inside the boot 28 away. This prevents the lens 26 and the front glass 8 from fogging up due to the humidity.

As shown in FIG. 1b, the video camera 15 is set to shoot the scenes through the front glass 8 where covered by the wipers 7 cleaning area. The wipers 7 clean the front glass 8 when it rains or the front glass 8 is dirty so the video camera 15 keeps good vision through the front glass 8.

Referring to FIG. 1a, the video camera 15 includes an image sensor and it's image signal is converted into 256 gradational digital signal by A/D converter 16. The converted signal which has 512×512 pixel/frame is put into an image memory 17. The microprocessor CPU 1 controls a focus of the video camera 15 and output signals by the video signal controller 14, the A/D converter 16 and the image memory 17.

Figure 3A:
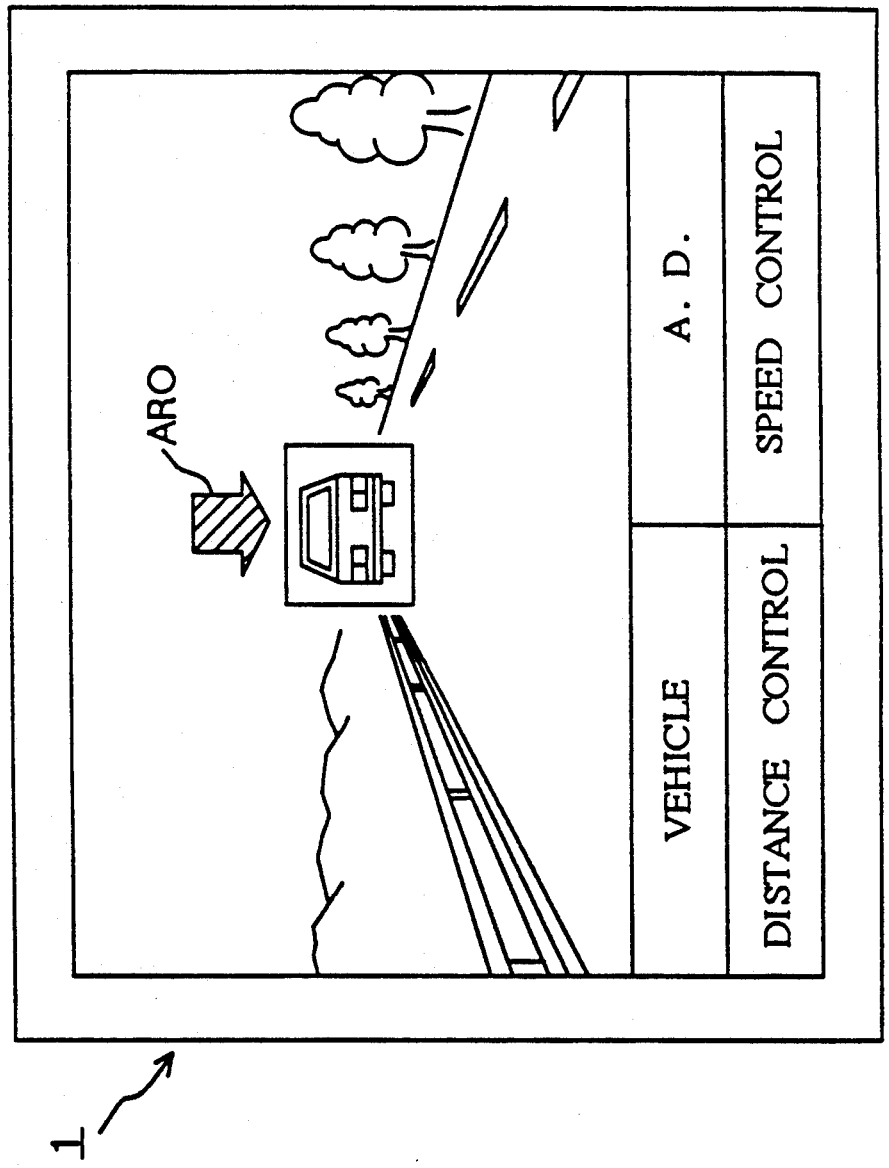

The microprocessor CPU 2 controls the image memory 17 and writes the signals into an output buffer 18. The output buffer 18 memorizes the image signals for display. The display controller 19 is connected to a CRT driver for driving a color monitor CRT 1, a display driver 21 for a character display 2 and an alarm driver 22 for a buzzer 22. The microprocessor CPU 2 processes image signals of the image memory 17 to detect a lane, an automobile driving ahead, a distance to the automobile driving ahead and a relative speed to the automobile driving ahead. An example of the display is shown in FIG. 3a. The details of the processing of image signals are disclosed in Japanese Patent Laid Open 64-66712 (1989). The monitor CRT shows the template ARO in color to indicate the scene of ahead of the vehicle and the vehicle driving ahead. In FIG. 3a, the microprocessor CPU 3 of the speed control device 13 sends information shown in the boxes. The microprocessor CPU 2 drives the character display 2 and the buzzer 4 in accordance with the signals from the microprocessor CPU 3.

Figure 1D:
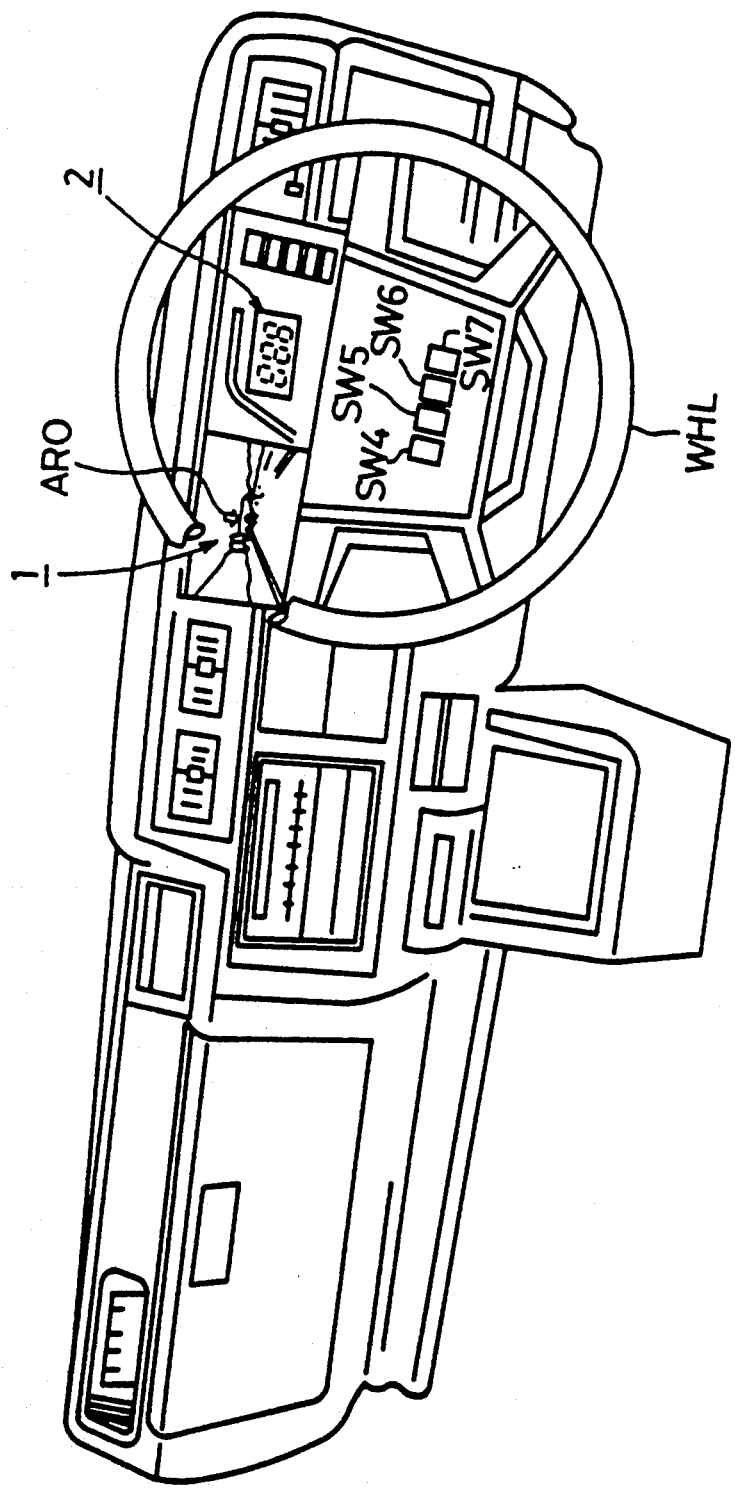
FIG. 1d is a drawing which shows a front view of an instrumental panel of an automobile in accordance with the present invention.

FIG. 1d shows the instrument panel in which the color monitor CRT 1 and the display 2 are mounted. Referring to FIG. 1a, ROM 11 stores a control program and RAM 12 stores parameters used in processing. A bus controller 10 controls the data transfer and addresses.

Figure 1E:
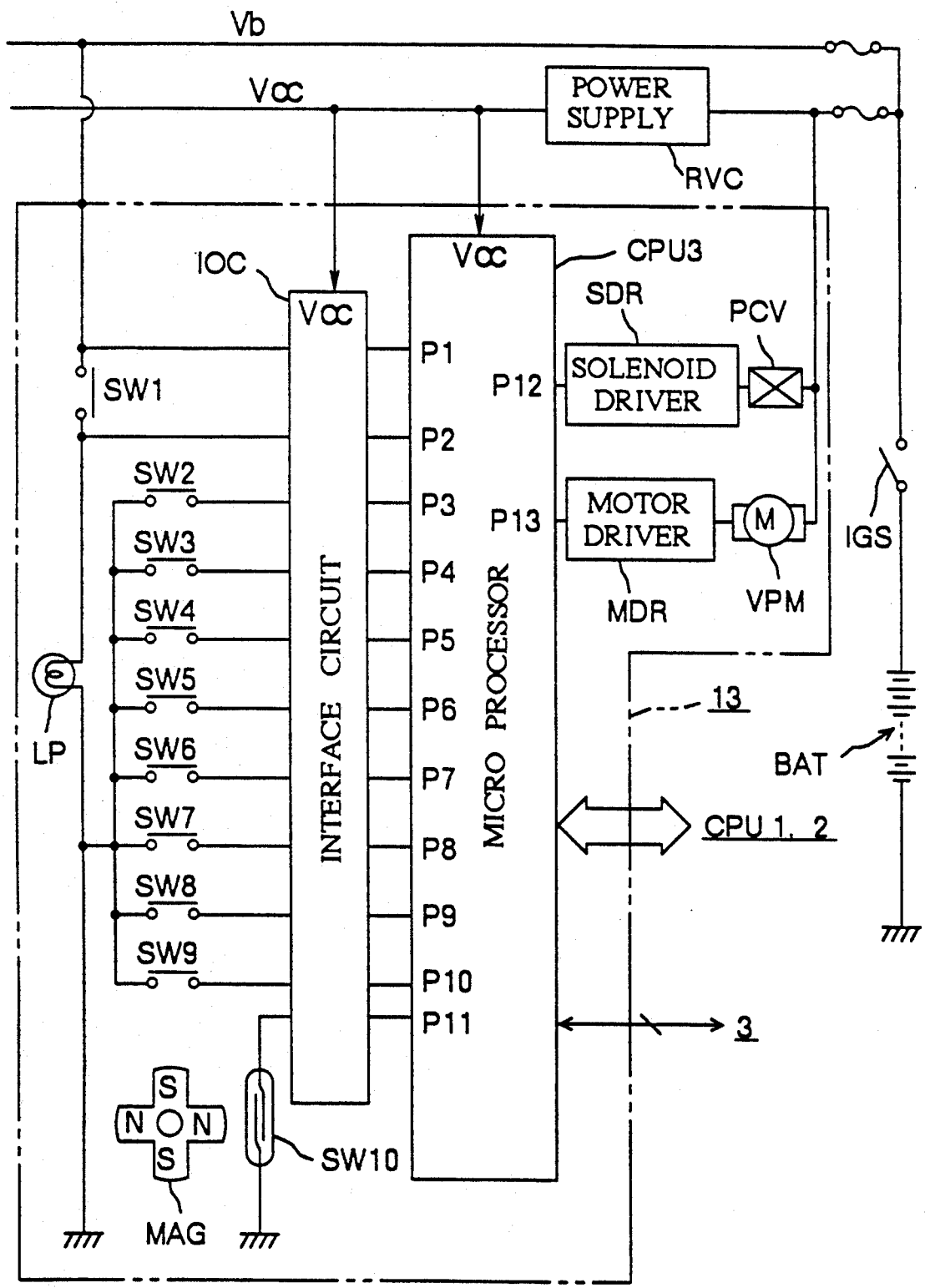

FIG. 1e shows a circuit diagram of the speed control device 13. The input ports P1-P11 of the microprocessor CPU 3 are connected to switches IGS, SW 1-SW 10 through an interface circuit IOC and the output ports P12 and P13 are connected to a solenoid driver SDR and a motor driver MDR. The switches SW 4-SW 7 are located on the center of the steering wheel WHL.

The functions of the switches are:
IGS: Ignition key switch (Power switch for the device 13)
SW 1: brake switch ("ON" when the brake is operated)
SW 2: clutch switch
SW 3: accelerator switch ("ON" when the accelerator pedal is operated)
SW 4: off switch for cruise control
SW 5: resume switch for cruise control
SW 6: power switch for cruise control
SW 7: on switch for automatic distance control
SW 8: turn signal (right)
SW 9: turn signal (left)
SW 10: speed sensor The switch SW 10 is a lead switch and a magnet MAG is located nearby. The magnet rotates as the same speed as the wheels. A stop lamp LP is mounted. One terminal of the switch SW 1 is connected to the plus terminal of the battery BAT through the engine key switch IGS and the other terminal of the switch SW 1 is grounded through the stop lamp LP. The terminals of the switch SW 1 are connected to the input ports P1 and P2 of the microprocessor CPU 3 through the interface circuit IOC. When the switch SW 1 is closed (ON), the input signal of the port P1 stays the same and the input signal of the port P2 changes from a low level "L" into a high level "H" if the system operate correctly. If the fuse of the battery line is off, the input signal of the port P2 stays the same and the input signal of the port P1 changes from a high level "H" into a low level "L".

The terminal of the switches SW 2-SW 10 are grounded so that the switches make the input ports P3-P9 to be grounded through the interface circuit IOC when the switches are closed (ON). The port P11 is used for interruption. The microprocessor CPU 3 calculates a speed of the automobile based on the signal form the switch SW 10 when the interruption is made.

A vacuum pump, a solenoid valve PCV for changing the air passage and a throttle actuator are attached to the engine for control. The vacuum pump is provided with a motor VPM which generate vacuum at the output port when operated. The solenoid valve PCV connects the throttle actuator with the vacuum pump. The microcomputer CPU 3 controls the power to the motor VPM and the solenoid valve PCV to send vacuum to the throttle actuator to increase the speed. The microprocessor CPU 3 controls the power to the solenoid valve PCV to keep the speed constant. The solenoid drover SDR sends the power to the solenoid valve PCV in response to the microprocessor CPU 3. The motor driver MDR sends the power to the motor VPM in response to the microprocessor CPU 3. The details of this system are disclosed in Japanese Patent Laid Open 62-153531 (1987).

Figure 2A:
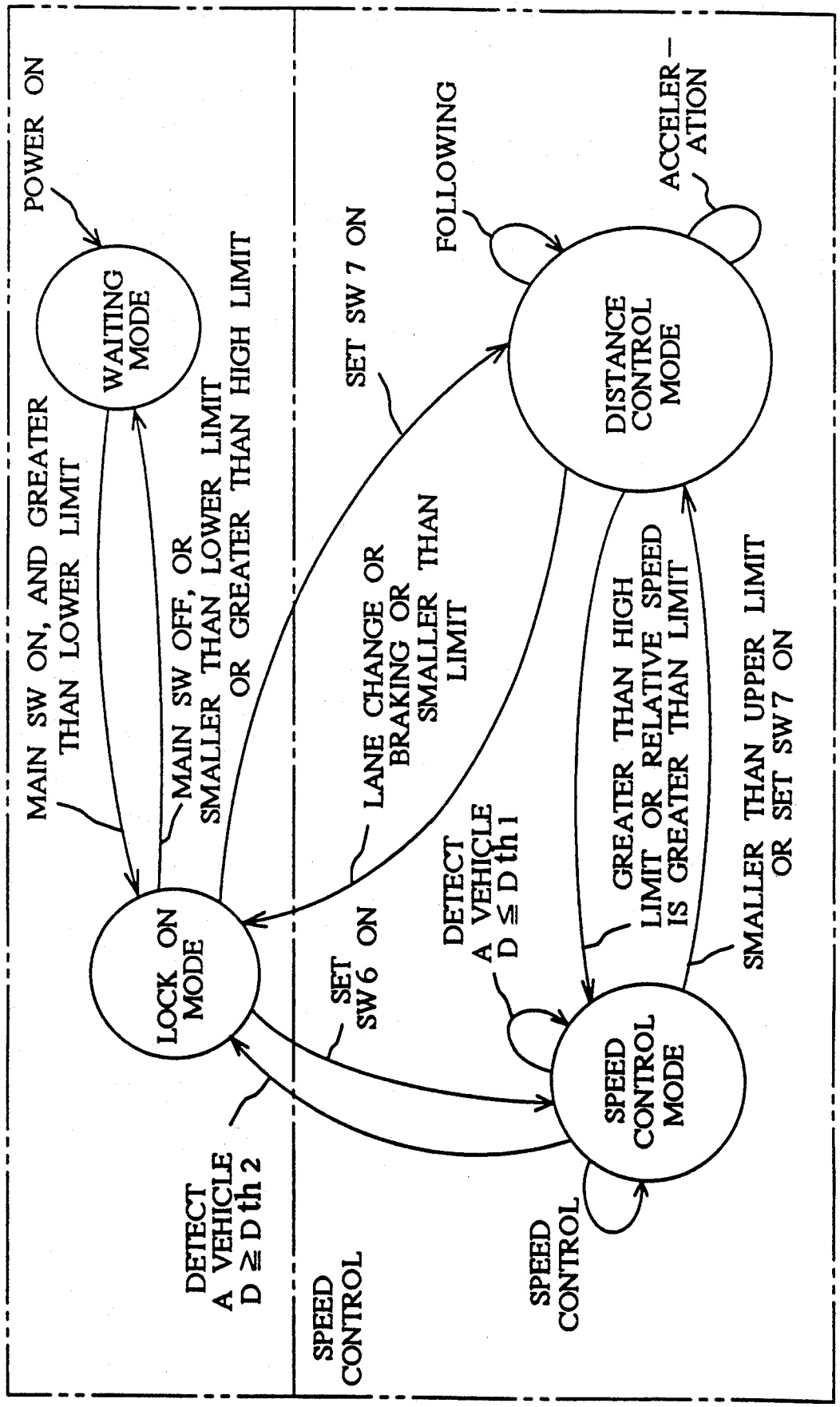

The microprocessor CPU 3 controls the four modes; "Waiting Mode", "Lock On Mode", "Distance Control Mode" and "Speed Control Mode". FIGS. 2a and 2b show the conditions of the modes. FIG. 2b also shows the contents of the display monitor CRT 1 and the buzzer.

FIG. 3b shows the timing of the buzzer operation and FIG. 3c shows the timing of the display timers 1 and 2 for the monitor CRT 1. FIGS. 5e through 7 show the operation of the microprocessor CPU 3.

Figure 5A:
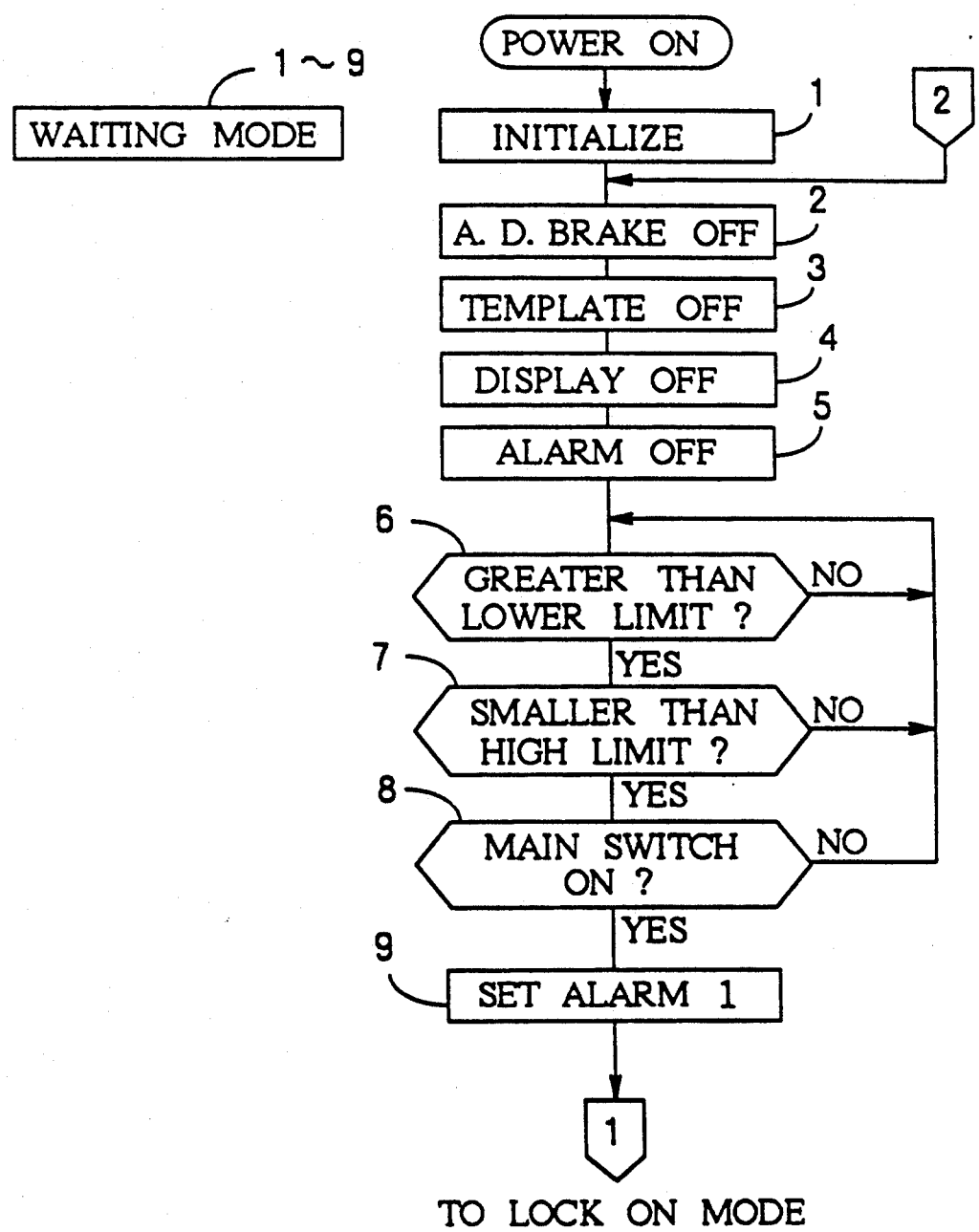
FIGS. 5a, 5b, 5c, 5d, 5e, 5f, 5g, 5h and 5i are flow charts which show an operation of a processor CPU 1 of the present invention.

(I) "Waiting Mode" (FIG. 5a)

When the engine key switch IGS is closed to supply the power to the constant voltage circuit RVC, the constant voltage circuit RVC supplies the power to the microprocessor CPU 3. The microprocessor CPU 3 initializes the memory, the counters and the registers (step 1). In this initialization the microprocessor CPU 3 sends the signal to cancel the speed control so that the driver operates the automobile. The system waits for the conditions that show the vehicle speed is higher than the low speed limitation and lower than the high speed limitation and the main switch is on in steps 2 through 8. When the conditions are met, the system sets the alarm 1 and goes to the "Lock On Mode". The alarm 1 sounds the buzzer one time as shown in FIG. 3b. The microprocessor CPU 1 sends the signal to the alarm driver 22. The microprocessor CPU 3 executes the timer interrupt TIP shown in FIG. 7 and stops the microprocessor CPU 1.

Figure 5B:
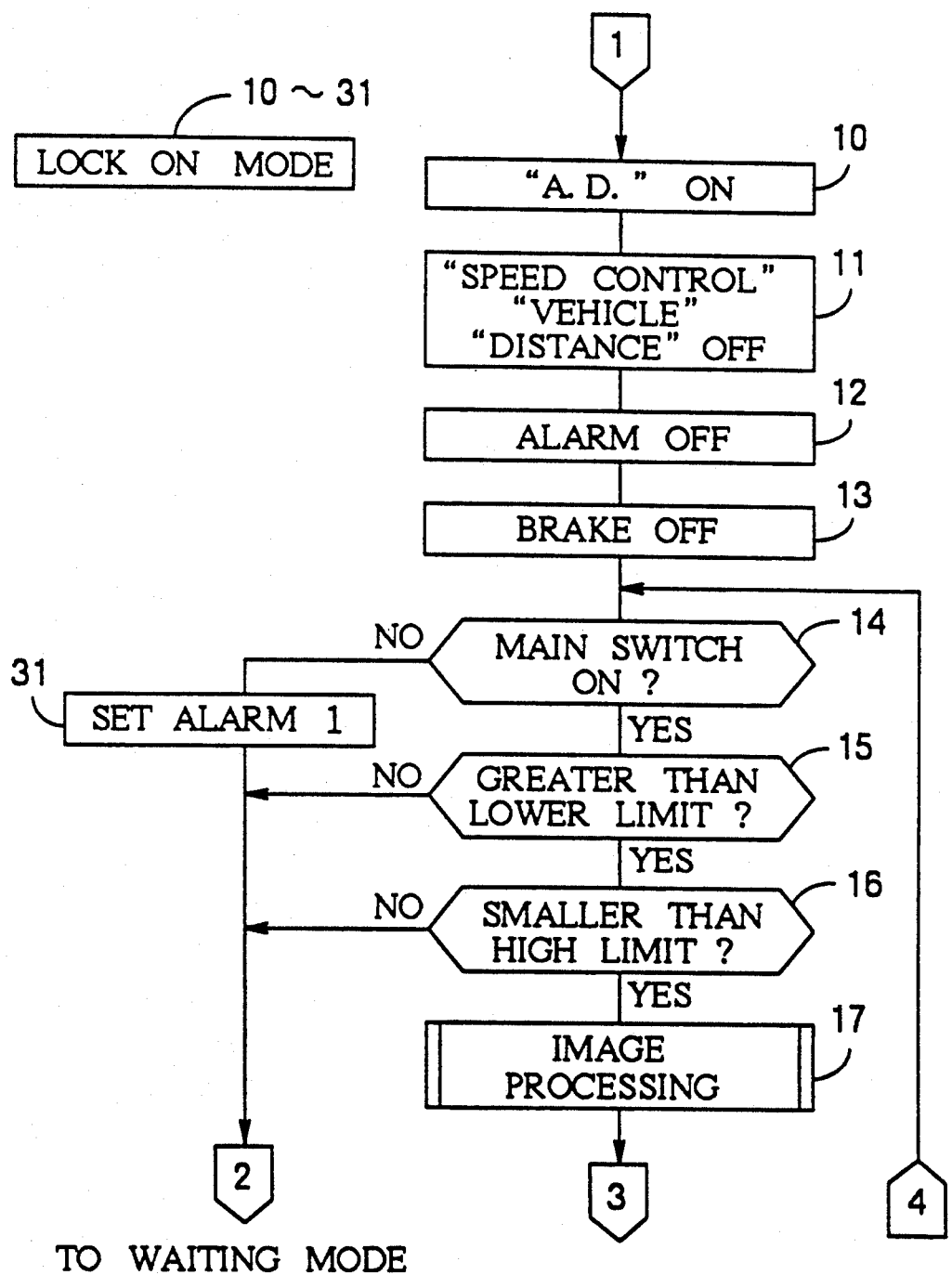
Figure 5C:
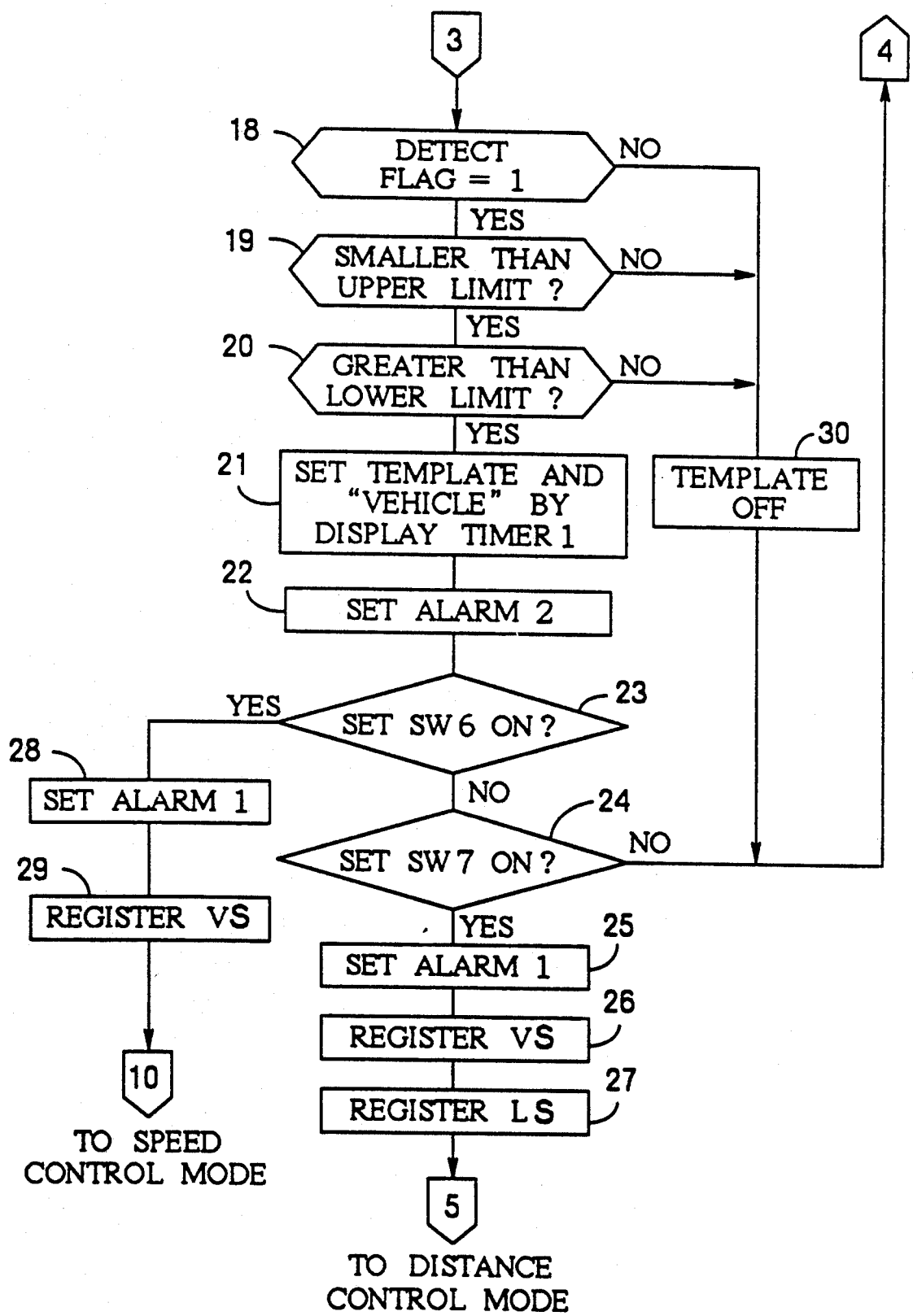
Figure 5D:
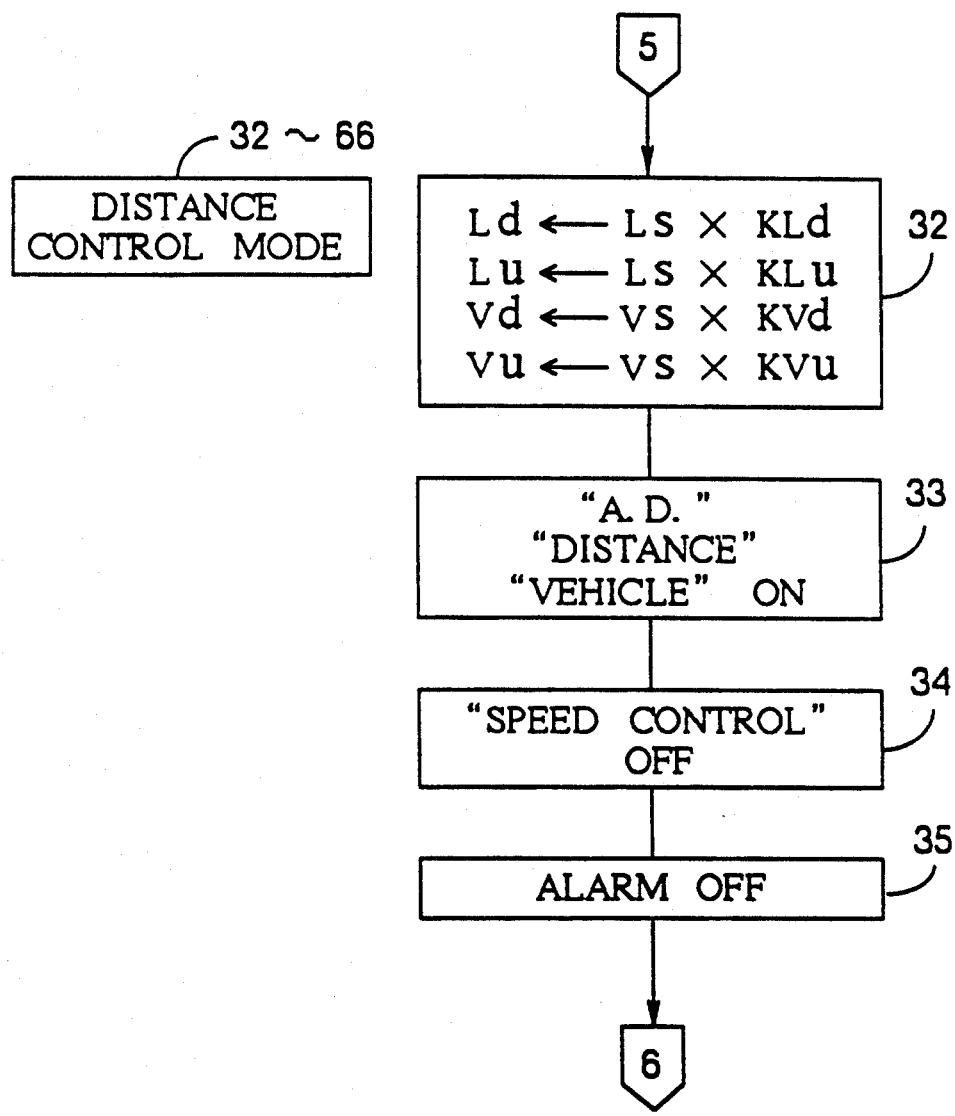

(II) "Lock On Mode" (FIGS. 5b and 5c)

In this mode, the system displays "A.D." on the monitor CRT 1 (FIG. 3a) and clears the alarm sets (alarm 1, 2 or 3) in steps 10, 11 and 12. In step 13 the system stops the speed control by setting off the actuators PCV and VPM and the brake. This step is for the system to cancel the control when the system goes to the "Lock On Mode" from the "Speed Control Mode" or from the "Distance Control Mode".

The microprocessor CPU 3 checks the vehicle speed whether the vehicle speed is between the low and high speed limitations in steps 15 and 16. Then the microprocessor CPU 3 sends the signal to the microprocessor CPU 2 to start the image process. The microprocessor CPU 2 processes the image signals and sends the signal to the monitor CRT 1 and the microprocessor CPU 3 in step 17. FIG. 6 shows the image processing process by the microprocessor CPU 2. The system displays the scene ahead of the vehicle, the template ARO which helps the driver for recognizing a vehicle driving ahead on the monitor CRT 1 and "A.D." indicator. If the detected vehicle driving ahead of the vehicle is far ahead, the template ARO is not displayed. When the template ARO and a vehicle are displayed on the monitor CRT 1, the display timer 1 is set to brink the template ARO and the "Vehicle" indicator in step 21. The system sets the alarm 2 in step 22.

When a vehicle speed becomes lower than the low speed limitation in step 16 or higher than the high speed limitation in step 15 or the main switch SW is turned off in step 14, the system goes to the "Waiting Mode". If the main switch SW is off, the system sets the alarm 1 in step 31.

When the system is in "Lock On Mode" and a distance is between the near and far distance limitations, the system waits for the switches SW 6 or SW 7 being on in steps 23 and 24. The switches 4 through 7 are turned on only while the switches are pressed. The switch SW 7 is pressed by the driver when the vehicle are driving in a desired distance and at a desired speed. The switch SW 6 is pressed by the driver when the vehicle are driving at a desired speed for speed control.

When the switch SW 7 is on, the system sets the alarm 1 in step 25, stores a vehicle speed into the speed register in step 26 and stores a distance Ls into the distance register in step 27.

When the switch SW 6 is on, the system stores a vehicle speed Vs into the speed register in step 29 then goes to "Speed Control Mode".

This system has "Distance Control" and "Speed Control" modes as the automatic controls. FIG. 4 shows the dangerous conditions D calculated in $D = K \times Vr/Ka$. The increase and decrease of a speed is determined based on this chart. K is a constant, Vr is a relative speed between the vehicle and a vehicle driving ahead and La is a distance. A relative speed Vr is calculated by the microprocessor CPU 2 and sent to the microprocessor CPU 3. When D indicates in the region DA 4 ($D \geq Dth\ 3$), the system sets the alarm 3 and controls the automatic brake. When D indicates in the region DA 3 ($Dth\ 2 \leq D < Dth\ 3$), the system controls the automatic brake. When D indicates in the region DA 2 ($Dth\ 1 \leq D < Dth\ 2$), the system controls the throttle to apply an engine brake. When D indicates in the region DA 1 ($D < Dth\ 1$), the system controls a speed and a distance.

(III) "Distance Control Mode" (FIGS. 5d through 5g)

The system determines the small regions when the dangerous condition is in the region D in step 32. The near distance limitation Ld is calculated in $Ld = Ls \times KLd$ (KLd is smaller than 1). The far distance limitation Lu is calculated in $Lu = Ls \times KLu$ (KLu is smaller than 1). The system also calculates a low speed limitation $Vd = Vs \times KVd$ (KVd is smaller than 1) and a high speed limitation $Vu = Vs \times KVu$ (KVu is greater than 1). The calculated values are stored in the registers. This process indicates the regions 1 through 9 in FIG. 4d. When the system is in "Distance Control Mode" and the dangerous condition D is smaller than Dth1 (Region DA 1), the system determines a region of the distance La and the speed Va and controls a speed in accordance with the region shown in FIG. 4c. After deciding the limitations, the system sends the signal to the microprocessor CPU 2 to turn on the indicates "A.D.", "Distance" and "Vehicle" and to turn off the indicator "Speed Control" in steps 33 and 34. The system resets the alarm in step 35.

The system goes to the image processing in step 41 when a speed is between the speed limitations. The image processing is shown in FIG. 6. The system calculates the dangerous condition $D = K \times Vr/La$ in step 52A shown in FIG. 5f. The system goes to steps in FIG. 5g. When the dangerous condition D is greater than Dth 3 (region DA 4) in step 131, the system sets the alarm and sends a brake signal to the brake control device 3 in steps 134 and 135. When the dangerous condition D is between Dth 2 and Dth 3 (region DA 3) in step 132, the system also sends a brake signal to the brake control device 3 in step 135. The brake control device 3 controls the solenoid valve in response to the brake signal to apply a brake. If the driver operates the brake pedal, the system goes to "Lock On Mode" from step 47 in FIG. 5e through steps 60 63 in FIG. 5f. Then the system turns off the brake control in response to the clear signal in step 13 in FIG. 5b.

When the dangerous condition D is between Dth 1 and Dth 2 in step 133, the system decreases the throttle valve opening in step 136. This speed decreasing controls and the speed increasing controls are disclosed in Japanese Patent Laid Open 62-153531.

When the dangerous condition D is below Dth 1, the system controls the automobile in accordance with the control chart shown in FIG. 4c.

Figure 4A:
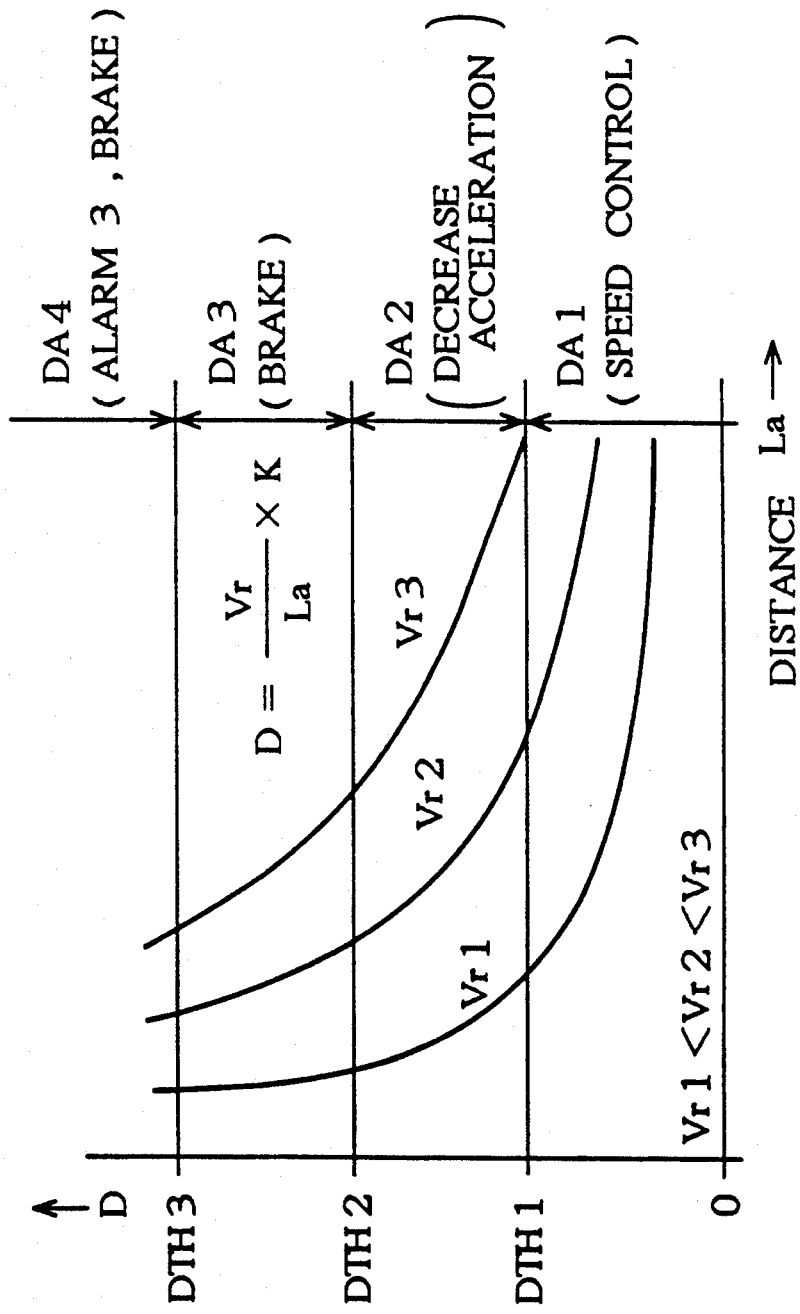
FIG. 4a is a graph which shows a dangerous situation related to distances to an automobile driving ahead.
Figure 4:
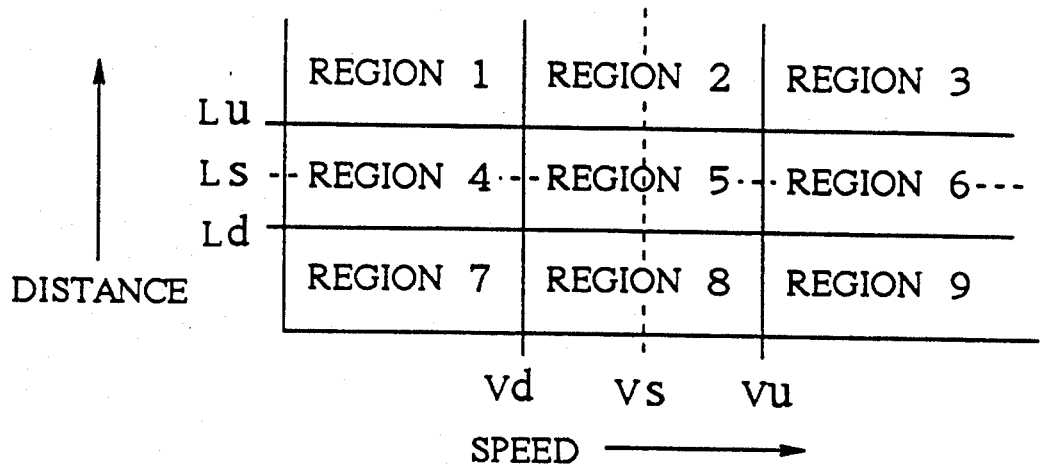

1) When a distance La is between the limitations Ld and Lu (Ld<La <Lu) and a speed Va is between the limitations Vd and Vu (Vd<Va <Vu) which is in region 5 of FIG. 4b, the system keeps the same speed.

2) When a distance La is smaller than the limitation Ld, the system decreases a speed.

3) When a speed Va is greater than Vu, the system decreases a speed.

4) When a distance La is greater than the limitation Lu, the system increases a speed.

5) When a speed La is smaller than the limitation Vd, the system increases a speed.

6) When the system needs a higher speed than the high speed limitation Vu to keep a distance La within the limitations (Ld<La <Lu), the system determines that the vehicle driving ahead is driving too fast to follow. The system stops the distance control and controls speed only.

7) When the system need a lower speed than the low speed limitation Vd to keep a distance La with the limitations, the system cancels the control.

The system sounds alarm and/or displays the indicators when the system changes modes.

Figure 5E:
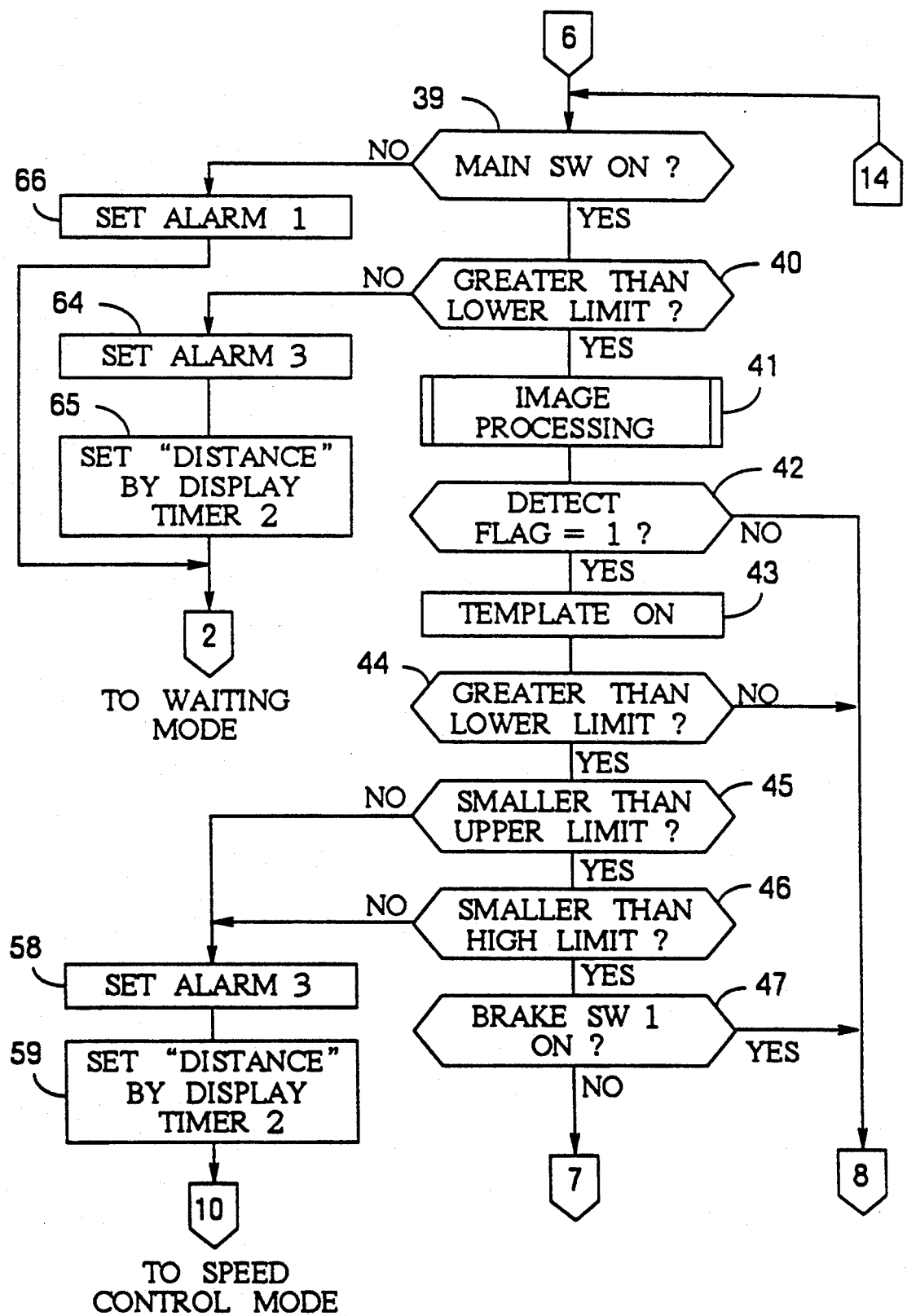
Figure 5F:
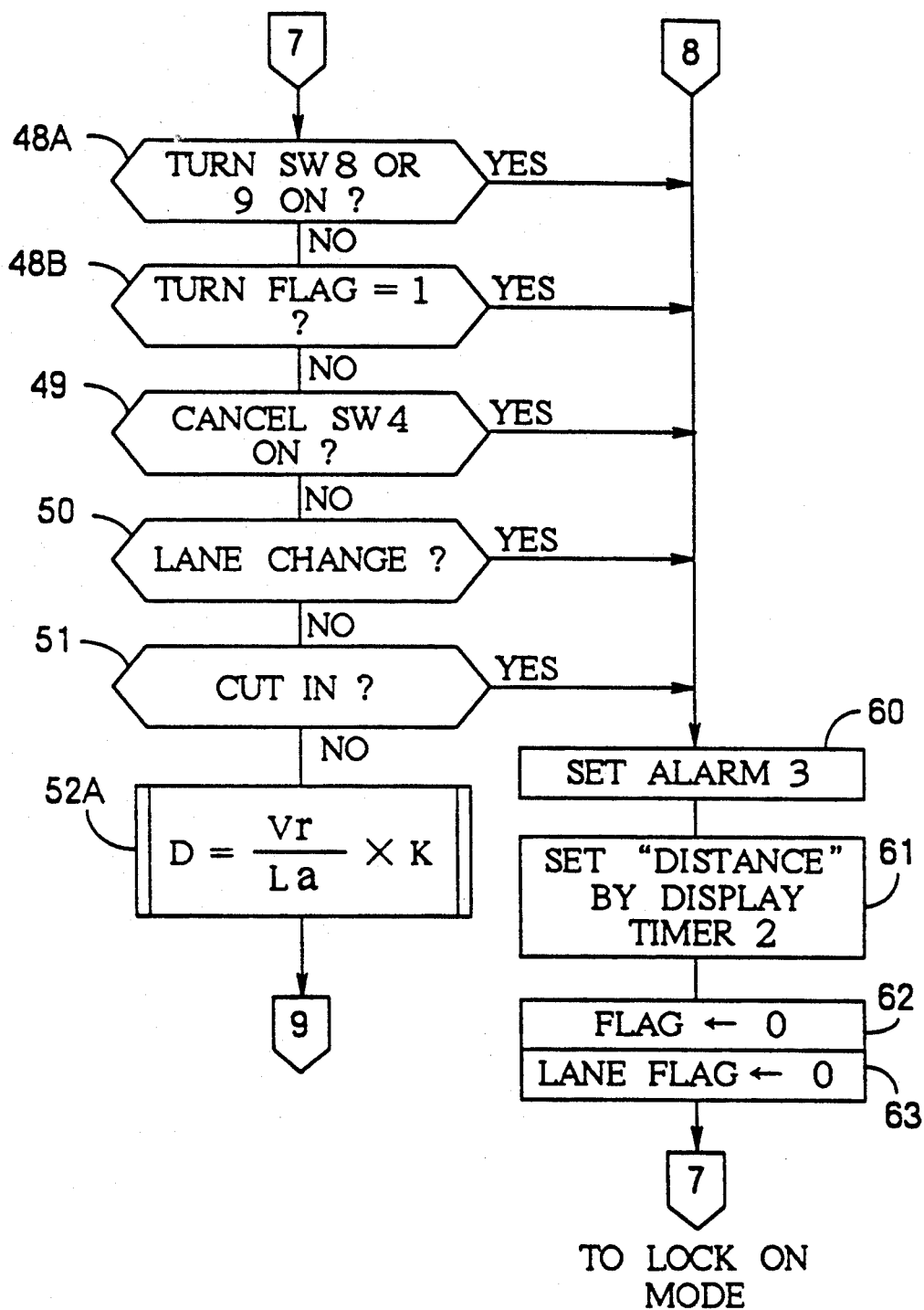

When the system changes mode into "Lock On Mode", if;

a) a distance La is smaller than the predetermined near distance limitation (step 44 in FIG. 5e, steps 60-63 in FIG. 5f);

b) a vehicle driving ahead is off the lane (steps 102 and 103 in FIG. 6, steps 50 and 60.63 in FIG. 5f);

c) the vehicle changes the lane (steps 97B and 97D in FIG. 6, step 48A in FIG. 5f and steps 48A, 48B and 60-63 in FIG. 5f);

d) another vehicle cuts in between your vehicle and the vehicle driving ahead of you (steps 104 and 105 in FIG. 6 and steps 51 and 60-63 if FIG. 5f); or e) a brake is operated by the driver (step 47 in FIG. 5e and steps 60-63 in FIG. 5f).

Once the system changes into "Lock On Mode", the system puts off the speed control and the automatic brake in step 13 in FIG. 5b. When the system changes mode into "Speed Control Mode", if;

a) a distance La is greater than the predetermined far distance limitation (steps 58 and 59 in FIG. 5e); or b) a speed is faster than the predetermined high speed limitation (steps 58 and 59 in FIG. 5e).

Figure 5G:
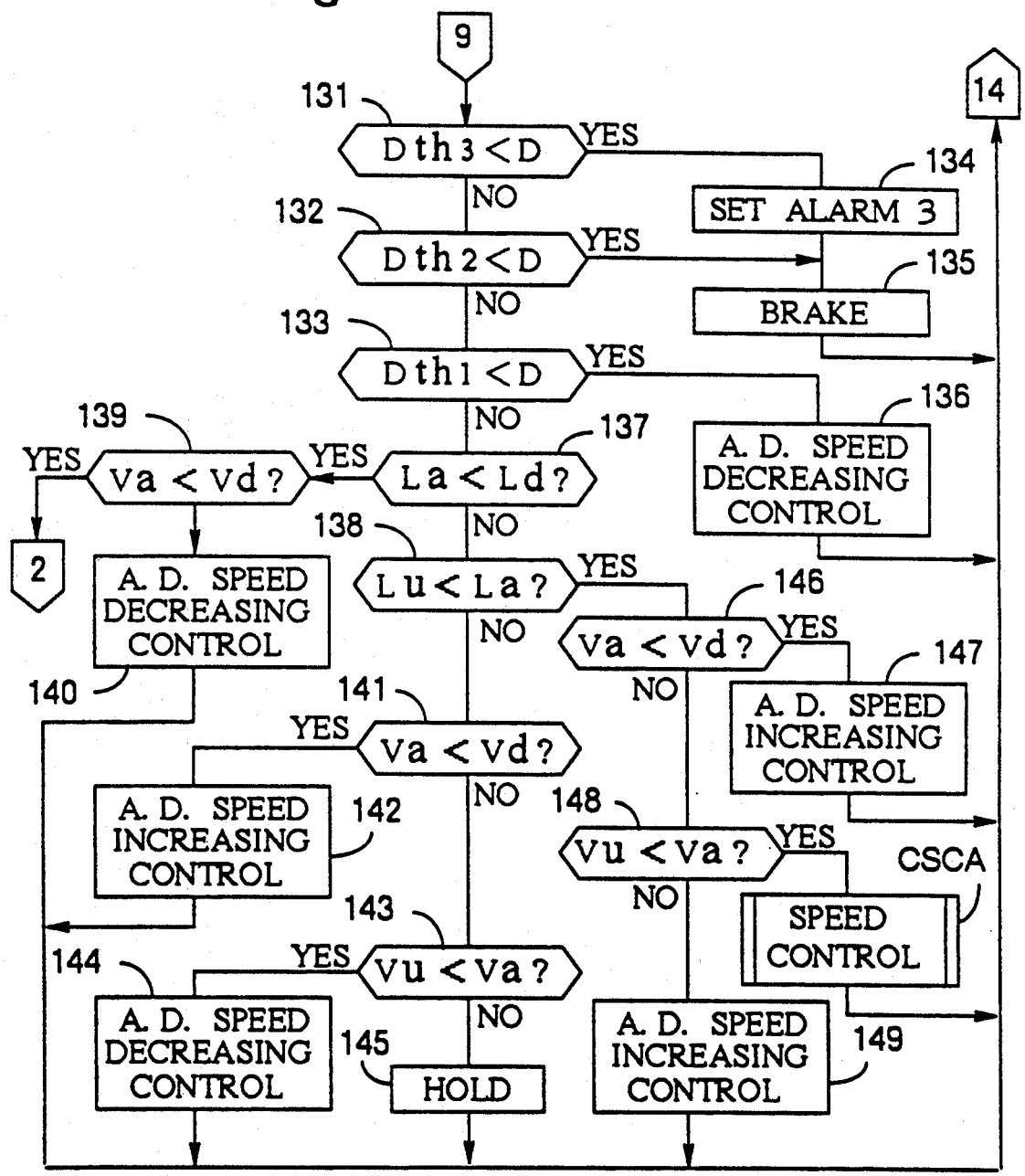
Figure 5H:
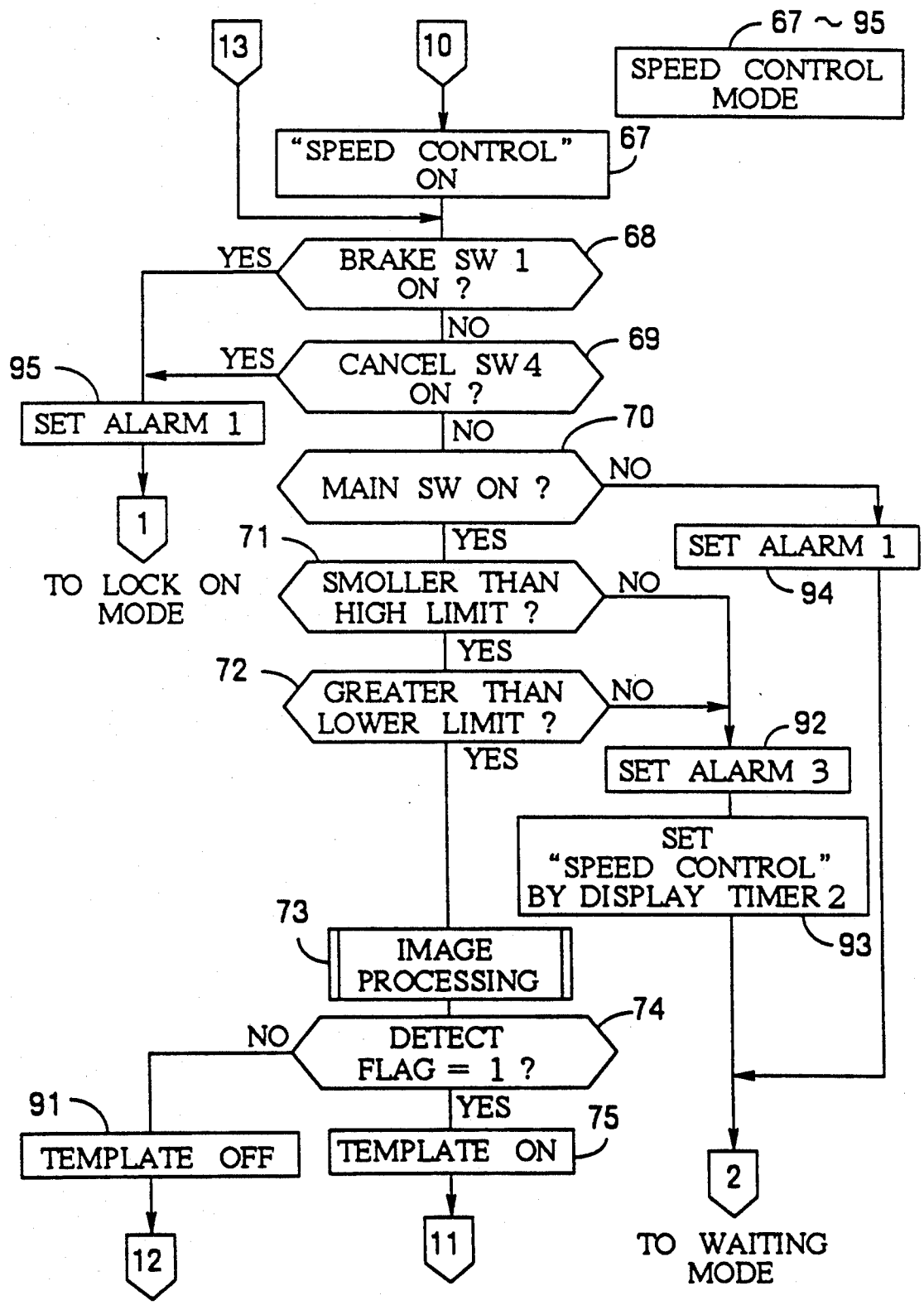
Figure 5I:
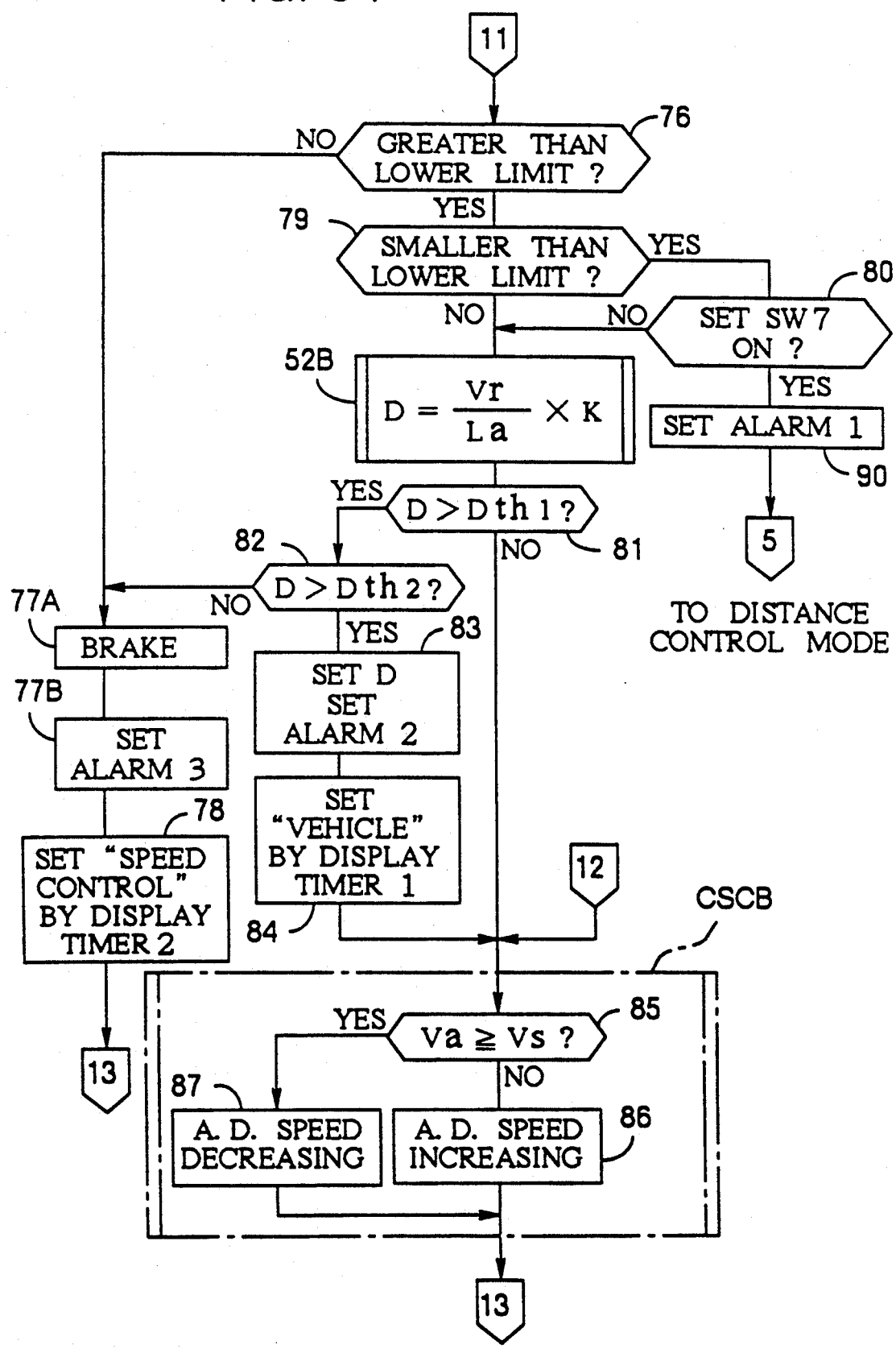

(IV) Speed Control Mode (FIGS. 5h and 5i)

The system displays "Speed Control" on the monitor CRT 1 in step 67. The system increases a speed when a speed V is smaller than the set speed in step 54 and decreases a speed when a speed V is greater than the set speed in step 55. These controls are disclosed in Japanese Patent Laid Open 62-153531.

When the system comes from the Speed Control Mode from the Distance Control Mode, the system keeps the speed which was set for the Distance Control Mode in steps 24-27 in FIG. 5c. The system calculates a dangerous condition $D = K \times Vr/La$ and controls a speed while a dangerous condition D is smaller than Dth 1 in steps 81 and 85-89 in FIG. 5i. While a dangerous condition D is greater than Dth 1 and smaller than Dth 2, the system sets the alarm 2, displays the template ARO and "Vehicle" on the monitor. The display is controlled by the display timer 1 in step 83 and 84 in FIG. 5i. A volume of the buzzer 4 is controlled based on the value of the dangerous condition D. A calculated dangerous condition D is stored in the register so that the system sets a volume of the buzzer 4 louder as a dangerous condition D becomes bigger in steps 115-124 in FIG. 7.

The system sounds alarm and/or displays the indicators when the system changes modes.

When the system changes mode into "Lock On Mode", if:

a) a dangerous condition D is greater than Dth 2, i.e. a speed is faster than the speed of the vehicle driving ahead and a distance is too close, the system sends a brake signal to the brake control device 3, sets alarm 3 and the display timer 2 in steps 77A, 77B and 78. If the driver operates a brake, the system goes back to the "Lock On Mode" in steps from 68 to 95. In the "Lock On Mode", the system clears the brake and cancels the speed control in step 13 in FIG. 5b.

b) the switch SW 1 or SW 4 is operated in steps 68 and 69-95 in FIG. 5h.

When the system changes mode into "Waiting Mode", if:

a) the switch SW 3 is open (steps 70-94 in FIG. 5h); or b) a speed is higher than the high speed limitation or smaller than the low speed limitation (steps 71, 72-9-2-93 in FIG. 5h). When the system changes mode into "Distance Control Mode", if the switch SW 7 is operated during a distance is between the limitations, the buzzer 4 is sounded in steps 76-79-70-90 in FIG. 5i.

The image processing in steps 17, 41 and 73 are the same and the details are shown in FIG. 6. This steps are executed by the microprocessor CPU 2.

In this process, the system recognizes and calculates the lanes, a vehicle driving ahead, distance, a relative speed in steps 96, 97A, 98, 100 and RVA. The system further determine whether the vehicle is in the lane or not. If the vehicle is in the lane, the system clears the turn flag register. If the vehicle is across the lane, the system sets 1 in the turn flag register in steps 97B, 97C and 97D.

When the system recognizes a vehicle driving ahead, the system calculates a distance and compares a new distance with the previous distance to detect whether the vehicle changes the lane or new vehicle cuts in in steps 102 and 104. If the vehicle changes the lane, the system sets 1 in the lane change flag register in step 103. If the new vehicle cuts in, the system sets 1 in the new vehicle flag register in step 105. If no vehicle is detected, the system clears the registers in steps 106-108.

The system sends the registers' data to the microprocessor CPU 3 for display. The monitor CRT 1 displays "A.D.", "Distance", "Speed Control" and "Vehicle" as shown in FIG. 3a. "A.D." is on during "Lock On Mode", "Distance Control Mode" and "Speed Control Mode". "Distance" is on during "Distance Control Mode". "Speed Control" is on during "Speed Control Mode". "Vehicle" is on while a vehicle is driving ahead of your vehicle.

Buzzer 4 and the display of the monitor CRT 1 are summarized as follows.

"Lock On Mode"
    No vehicle is driving ahead;

display the indicator "A.D.",
off the indicators "Distance", "Speed Control" and "Vehicle", and
off the buzzer 4.
A vehicle is driving ahead;
display the indicator "A.D.",
flash "Vehicle" by the display timer 1,
off the indicators "Speed Control" and "Distance",
flash the template ARO by the display timer 1, and
sound the buzzer 4 by the alarm 2 when a dangerous condition
D is between Dth 1 and Dth2 and control the volume of the buzzer 4 depends on the dangerous condition D.

"Speed Control Mode"
No vehicle is driving ahead;
display the indicators "A.D." and "Speed Control",
off the indicators "Vehicle" and "Distance",
off the template ARO, and
stop the buzzer 4.
A vehicle is driving ahead;
display the indicators "A.D." and "Speed Control",
off the indicator "Distance",
flash the indicator "Vehicle" and the template ARO by the display timer 1, and
sound the buzzer 4 by the alarm 2 when a dangerous condition D is between Dth 1 and Dth2 and control the volume of the buzzer 4 depends on the dangerous condition D.
From "Speed Control Mode" to "Waiting Mode", "Lock On Mode" or "Distance Control Mode"
sound the buzzer 4 by the alarm 3 for a predetermined period of time and
flash the indicator "Speed Control" by the display timer 2 for a predetermined period of time.

"Distance Control Mode"
display the indicators "A.D.", "Vehicle" and "Distance",
display the template ARO on the monitor CRT 1, and off the indicator "Speed Control".
From "Distance Control Mode" to "Waiting Mode", "Lock On Mode" or
"Speed Control Mode"
sound the buzzer 4 for a predetermined period of time, and
flash the indicator "Distance" by the display timer 2 for a predetermined period of time.

Miscellaneous
sound the buzzer 4 once when the switches SW 4, SW 5, SW 6 or SW 7 is operated.

Figure 7:
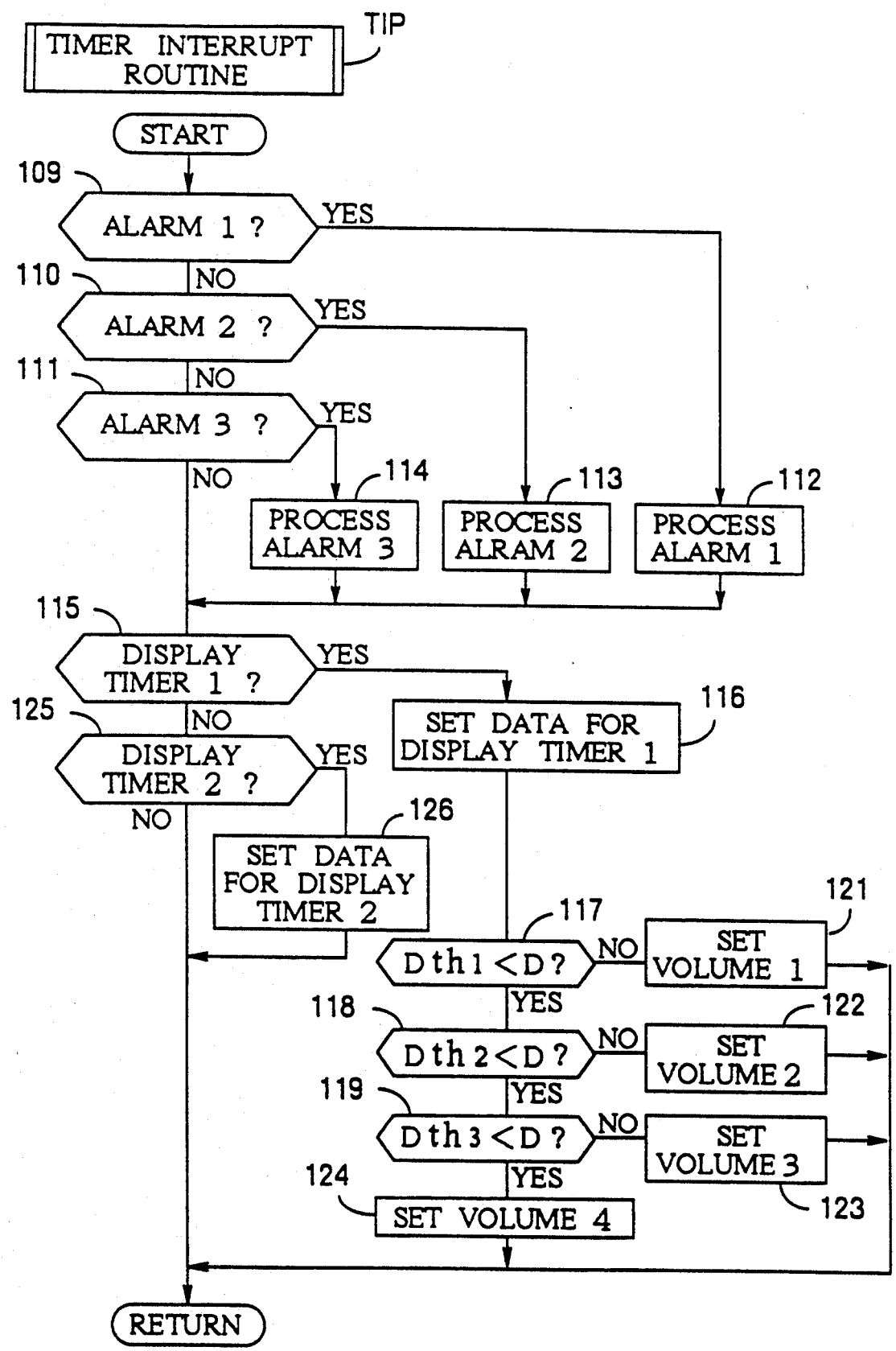
FIG. 7 is a flow chart which shows an operation of a processor CPU 3 of the present invention.

FIG. 7 shows a timer interrupt routine for the timers.

In accordance with the above mentioned system, the driver operates the switch 7 when the vehicle is in a desired speed and the distance in "Lock On Mode". The speed and the distance are set in the registers in steps 24-27 in FIG. 5c and the distance control begins. A dangerous condition D is calculated by a speed of the vehicle, a speed of the vehicle driving ahead and a distance La such as in the formula of $D = K \times Vr/La$.

When a dangerous condition D is higher than Dth 2, the automatic brake is operated in step 135 in FIG. 5g. When a dangerous condition D is between Dth 1 and Dth2, a throttle opening is decreased. When a dangerous condition D is smaller than Dth 1, the operations shown in FIG. 4c are executed.

If a distance La becomes higher than the far distance limitation or a speed becomes higher than the high speed limitation, the system goes back to speed control in steps 45, 46-58-59 in FIG. 5e, 67 in FIG. 5h and 85-87 in FIG. 5i.

While driving in "Speed Control Mode", if the driver operates the switch SW 7, the system resumes distance control.

The invention has been described in an illustrative manner, and it is to be understood that the terminology which has been used in intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A cruise control system for a first vehicle comprising:
    means for detecting a distance to a second vehicle driving ahead of the first vehicle;
    detecting means for detecting an actual speed of the first vehicle;
    switch means for initiating operation of said cruise control system;
    setting means for setting upper and lower distance limitations and upper and lower speed limitations in accordance with the actual speed of the first vehicle and the distance between the first vehicle and the second vehicle respectively which are measured when said switch means is turned on; and
    control means for controlling the actual speed of the first vehicle in such a manner that when the actual speed is smaller than the lower speed limitation the actual speed of the first vehicle is increased, when the actual speed of the vehicle is greater than the upper speed limitation the actual speed of the first vehicle is decreased, when the actual distance is smaller than the lower distance limitation the actual speed of the first vehicle is decreased, when the actual distance is greater than the upper distance limitation the actual speed of the first vehicle is increased, and when the actual speed of the vehicle is between the upper and the lower limitations and the actual distance is between the upper and the lower distance limitations the actual speed of the first vehicle remains unchanged.

2. A cruise control system as set forth in claim 1, wherein said control means for controlling the actual speed of the first vehicle, when the actual distance is greater than the upper distance limitation even though the actual speed of the first vehicle is greater than the upper speed limitation, further changes the speed of the first vehicle to a value which is equal to the actual speed of the vehicle upon closure of said switch means.

3. A cruise control system as set forth in claim 1, wherein said control means for controlling the actual speed of the first vehicle is set to be cancelled when the actual speed of the first vehicle is smaller than the lower speed limitation and the actual distance between the first and second vehicles is smaller than the lower distance limitation.

* * * * *